United States Patent [19]
Schlessel

[11] 3,991,947
[45] Nov. 16, 1976

[54] SELF-CONTAINED DETACHABLE GRINDING DEVICE

[75] Inventor: Walter Schlessel, Lawrence, N.Y.
[73] Assignee: Gemco-Ware, Inc., Freeport, N.Y.
[22] Filed: Aug. 15, 1975
[21] Appl. No.: 604,939

[52] U.S. Cl. .......................... 241/169.1; 241/DIG. 6
[51] Int. Cl.² ..................... A47J 42/04; A47J 42/08
[58] Field of Search ................ 241/168, 169, 169.1, 241/199.7, 199.12, DIG. 6

[56] References Cited
UNITED STATES PATENTS

| | | | |
|---|---|---|---|
| 2,479,151 | 8/1949 | Bostick | 241/169.1 |
| 2,507,670 | 5/1950 | Jotkoe et al. | 241/169.1 |
| 3,136,491 | 6/1964 | Posmanter | 241/169.1 |
| 3,633,834 | 1/1972 | Nissen | 241/169.1 |
| 3,827,641 | 8/1974 | Andersson | 241/169.1 X |

Primary Examiner—Granville Y. Custer, Jr.
Assistant Examiner—Howard N. Goldberg
Attorney, Agent, or Firm—Lackenbach, Lilling & Siegel

[57] ABSTRACT

A self-contained grinding device, for pepper corns and the like, includes only three molded plastic elements and can be attached to a suitable container which stores the material to be ground. The device includes two cylindrical housings which are end connected to form a rotary joint and an elongate gear member which has a grinding head portion which cooperates with a grinding chamber formed in a first housing remote from the container. The gear member has a shaft portion with a bifurcated end which extends from the first housing into a second housing connected to the container. The gear member is fixed to the second housing by a snap-fitting engagement of the bifurcated free end with a transverse bridge arm which is integrally formed with the second housing. The bridge arm is additionally connected to a hopper wall similarly integrally formed with the second housing, which hopper wall feeds the pepper corns from the container to the grinding chamber in the first housing. The second housing includes projections suitable for engaging the external threads of the container such as a jar. The gear member is a grinding element as well as a means for maintaining the three elements of the grinding device together both when connected or disconnected from the storage container. A projection is advantageously provided in the grinding chamber which cooperates with the grinding head portion to ensure effective grinding action of the pepper corns which reach the grinding chamber.

17 Claims, 6 Drawing Figures

SELF-CONTAINED DETACHABLE GRINDING DEVICE

BACKGROUND OF THE INVENTION

The present invention generally relates to grinding devices, and more specifically to a self-contained grinding device formed of only three molded plastic elements and which is detachable from a storage container for the material to be ground.

Various grinding, grating, milling and hulling devices are known in the prior art. Typical of such devices of which applicant is aware are disclosed in the following U.S. Pat. Nos.

| | |
|---|---|
| 3,642,045 | Buvelot |
| 3,633,834 | Nissen |
| 3,578,253 | Brilliant, Jr. |
| 3,371,874 | Reeves et al |
| 3,347,295 | Feiling |
| 3,136,491 | Posmanter |
| 2,963,232 | Smith |
| 2,782,998 | Hastings, Jr. |
| 2,763,440 | Johnson |
| 2,688,448 | Lenz |
| 2,479,151 | Bostick |
| 2,407,808 | Bivans |
| 1,327,385 | Hammer |
| 1,264,134 | Quick |
| 1,021,950 | Shepard |
| 274,255 | Barr |
| 197,982 | Seifert |

A review of these issued patents indicates that many of the prior art devices relating to grinding or milling apparatus are generally complex in construction and, therefore, expensive to manufacture. In most of the above patents, the devices described are made of numerous elements which must be assembled during manufacture of the devices. Aside from increasing the overall expense in the manufacture of such devices, it is clear that the greater the number of parts utilized the greater the probability of malfunction as a result of one of these many elements becoming damaged such as by excessive wear thereof with continued use.

In most of the prior art devices, the mill or grinder incorporates a storage compartment which must be filled with the material to be ground. In such instances, the mill is filled from a source or container in which the material is stored. In U.S. Pat. No. 3,371,874, there is disclosed a pepper mill which may be detached from a storage container. However, the pepper mill disclosed in this patent is relatively complex in construction and utilizes numerous parts, a disadvantage above mentioned.

The remainder of the above patents are of interest only in that they disclose various structural elements which are sometimes found in grinding and milling devices of the type under discussion. However, an examination of the above references does not disclose a device which is only formed of three molded plastic elements which may be snap-fitted together to form a substantially self-contained unit which may be attached to any suitable container, such as a stock jar or a disposable container which may be connected to the grinding device and which may be disposed after all the material therein has been ground. The grinding device which is the subject of the present invention is extremely simple in construction and permits substantial reductions in the cost of manufacture thereof. For this reason, the present invention makes it possible to reduce the cost of, for example, pepper mills, which prices have in the past been relatively high because of the above-mentioned complexity of construction.

SUMMARY OF THE INVENTION

Accordingly, it is an object of the present invention to provide a grinding device which does not have the disadvantages inherent in the above referenced prior art.

It is another object of the present invention to provide a grinding device which is simple in construction and economical to manufacture.

It is still another object of the present invention to provide a grinding device of the type under discussion which is self-contained and is attachable and detachable from a storage container which serves to store the material to be ground.

It is yet another object of the present invention to provide a grinding device of the type above suggested which includes only three molded plastic elements, which three elements co-act to form a grinding unit both when connected to or separated from a storage container which stores the material to be ground.

It is a further object of the present invention to provide a grinding device of the type under consideration which includes plastic molded elements and which provides the necessary structural strength which is required to grind material, such as pepper corns, without excessive deformation and damage to the elements of the grinding device.

It is still a further object of the present invention to provide a grinding device which efficiently grinds material, such as pepper corns, with minimum revolution of the grinding elements.

It is yet a further object of the present invention to provide a grinding device which is provided with a grinding head which simultaneously agitates, for example, pepper corns and advances the same from a storage area into the grinding chamber and subsequently grinds the pepper corns to different degrees of relatively coarse pepper grains.

In order to achieve the above objects, as well as others which will become apparent hereafter, a self-contained grinding device for pepper corns and the like attachable to a container for pepper corns, comprises a first hollow housing having one axial end thereof provided with an end wall. Said end wall is formed with a grinding chamber defining outer grinding means and a dispensing opening. A second hollow housing is provided which has one axial end thereof provided with a tapered wall in the nature of a hopper proximate to said first housing and converging in the direction thereof. The other end of said first housing and said one end of said second housing together form a rotary joint to permit relative rotation between said housings when they are joined in axial alignment. Said tapered wall has a discharging opening at the narrow end thereof which registers with said grinding chamber to permit the pepper corns to be fed by said tapered wall into said grinding chamber when said discharging opening is positioned above said grinding chamber. The other end of said second housing is provided with connecting means for connecting the same to a container containing the pepper corns. Said second housing further has a generally transverse bridge arm. A gear member is provided which defines an inner grinding means, said gear member having a head portion receivable within said grinding chamber for limited axial movements therein and cooperating therewith to grind the pepper corns within said grinding chamber upon relative rotation of said inner and outer grinding means. Said gear member further has a shaft portion projecting from said head portion and extending through said first housing and into said second housing. Said shaft portion has a bifurcated free end and a length to permit snap-fitting engagement with said bridge arm to substantially lock the relative axial positions of said first and second housings and said gear member to each other and only permits rotational movements of said second housing and said gear member relative to said first housing. In this manner, rotation of said first and second housings relative to each other causes corresponding rotation of said inner and outer grinding means relative to each other and causes grinding of pepper corns which are guided by said tapered wall from the container to said grinding chamber.

BRIEF DESCRIPTION OF THE DRAWINGS

This and further features and objects of the invention will become more apparent from the following description with reference to the accompanying drawings, in which.

DESCRIPTION OF THE PREFERRED EMBODIMENT

Figure 1:
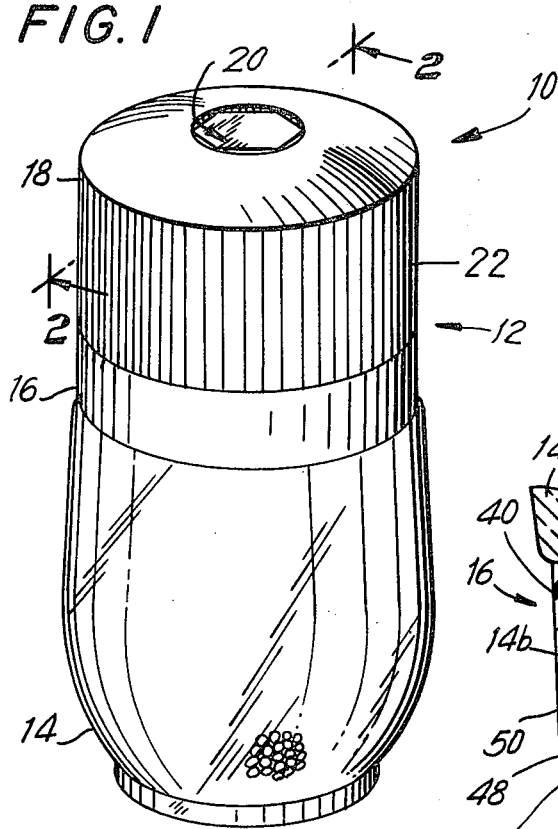
FIG. 1 is a perspective view of the grinding device in accordance with the present invention, shown mounted on or connected to a jar which forms a storage container for the material to be ground, such as pepper corns, and showing the normal, upright position of the grinding device when the same is not in use.

Referring now specifically to the drawings, in which identical or similar parts are designated by the same reference numerals throughout, and referring first to FIG. 1, there is shown a pepper mill 10 which includes a grinding mechanism in accordance with the present invention, and which is generally designated by the reference numeral 12. The grinding mechanism 12 is attached or connected to a container 14 which stores material to be ground, such as pepper corns. In the pepper mill 10 being described, the container 14 is in the nature of a stock glass jar. As will become evident from the description that follows, the nature of the container 14 is not critical for the purposes of the present invention and may comprise any suitable container in which for example, pepper corns are stored or purchased. In the presently preferred embodiment being described, the jar 14 may be refilled with pepper corns from time to time although the present invention also contemplates the use of disposable containers 14 which are simply replaced after the pepper corns stored therein have been ground and fully dispensed.

The grinding mechanism in accordance with the presently preferred embodiment of the invention includes only three molded plastic parts or elements, namely a cylindrical housing 16, a cylindrical housing 18, and a grinder or gear member 20. As will become evident hereafter, the external configurations of the housings 16 and 18 need not be cylindrical as shown, but may assume any desired configuration, such as square, hexagonal and the like. Advantageously, the housing 18 is provided with a circumferential array of grooves or serrations 22 on the external surface thereof to readily distinguish the housings 16 and 18 and to convey the suggestion that the housing 18 be gripped with one hand while the container 14 and the roller 16 be gripped with the other hand, and that the housings be turned relative to one another to effect grinding.

Figure 2:
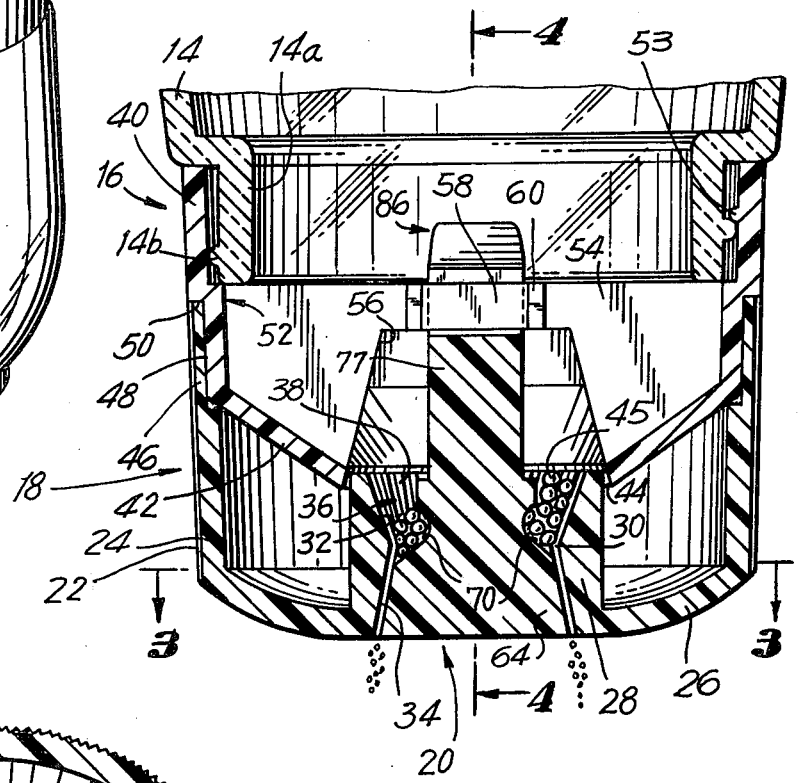
FIG. 2 is a fragmented cross-sectional view of the grinding device and jar shown in FIG. 1, taken along line 2—2, showing the manner in which the grinding device is attached to the jar or storage container and the manner in which the pepper corns or seeds are funnelled into a grinding chamber.
Figure 3:
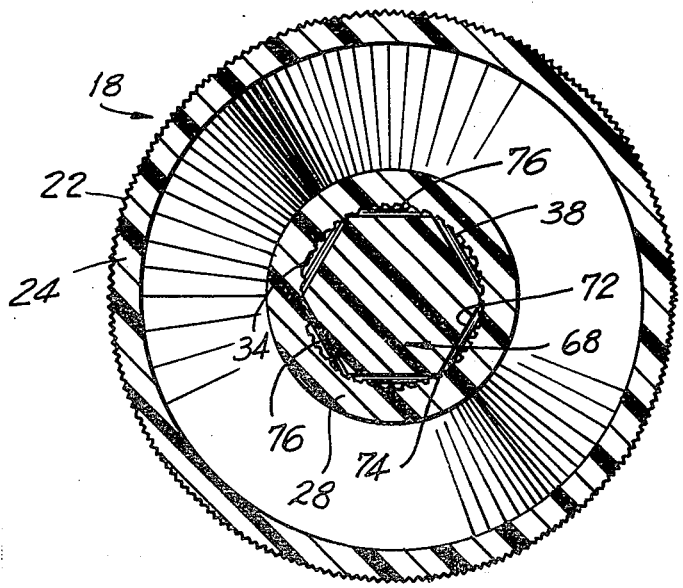
FIG. 3 is a cross-sectional view of the grinding device shown in FIG. 2, taken along line 3—3, showing the details of the grinding chamber as well as the grinding head of the gear member and the manner in which these elements cooperate to grind the pepper corns.

As will become clear from FIG. 2, the housings 16 and 18 are essentially hollow and have cylindrical interior surfaces which are coaxially aligned along the axis defined by the gear member 20. Each of the housings 16, 18 being cylindrical in nature, the ends of the cylindrical walls of each of the housings will be defined, for facilitating the description, as axial ends of the cylindrical walls. Thus, the cylindrical side wall 24 of the housing 18 has one axial end thereof, namely the lower end shown in FIG. 2, provided with an end wall 26 as shown.

The end wall 26 is formed with an annular cylindrical outer grinding portion 28 which projects axially into the housing 18. A central annular constriction 30 is formed in the annular portion 28 and outer and inner frustoconical diverging surfaces 34 and 32 extend from the central constriction along the general axis of the housing 18. The surfaces 32 and 34 together define a grinding chamber 36 within the annular portion 28. Each of the surfaces 32 and 34 is provided with generally axially directed ribs 38 which project from the converging surfaces into the grinding chamber 36. The grinding chamber 36, together with the ribs 38, forms outer grinding means and a dispensing opening for the ground pepper grains.

The housing 16 is also cylindrical and has a cylindrical wall 40 substantially of the same diameter as the diameter of the wall 24. At one axial end of the wall 40, namely the lower axial end in FIG. 2, the housing 16 is provided with a tapered wall in the nature of a hopper 42, which hopper is proximate to the housing 18 and converges in the direction thereof as shown. The tapered wall 42 has a discharging opening 44 at the narrowed end thereof which registers with the grinding chamber 36 to permit the pepper corns to be fed by the tapered wall 42 into the grinding chamber 36 when the discharging opening 44 is positioned above the grinding chamber 36 as shown in FIG. 2. Accordingly, pepper corns 45 which are initially stored within the container 14 are permitted to drop through the neck 14a of the container 14 and into the hopper 42 which feeds the pepper corns 45 into the grinding chamber 36 when the pepper mill 10 is moved from its normal upright position shown in FIG. 1 to its inverted operative position shown in FIG. 2.

At the opposite or other axial end of the wall 24 from that where the end wall 26 is provided, the side wall 24 is provided with an annual skirt portion 46 while the axial end of the wall 40 where the hopper wall 42 emanates from is somewhat radially reduced in diameter so as to provide an annular recess 48 and an annular shoulder 50 as shown. The external diameter of the wall 40 in the region of the hopper 42 is substantially equal to the internal diameter of the annular skirt 46. Advantageously, the axial length of the annular recess 48 is approximately equal to the axial length of the annular skirt 46 so that when the housings 16 and 18 are mated as shown in FIG. 2 there is formed a rotary joint 52 which permits relative rotation between the housings when they are joined in axial alignment.

At the axial end of the housing 16 opposite to the end where the hopper 42 is formed, there is provided connecting means for connecting the housing 16 to the container 14 which stores the pepper corns or the like. This forms an important feature of the present invention since it permits the grinding mechanism 12, which is in the nature of an independent item from the storage container, to be connected or attached thereto. As suggested above, such a storage container may be a permanent refillable type of container or may be a dispensable container as desired. Referring to FIG. 2, in the presently preferred embodiment being described, the grinding mechanism 12 is adapted to be connected to a container, such as a stock jar, which is provided with screw threads 14b about the neck 14a thereof. The housing 16, at the axial end opposite to that where the hopper wall 42 is provided, is formed with a plurality of circumferentially spaced projections 53 suitable for being received and threadedly engaged with the screw thread 14b provided on the container. However, as should be evident, this method of connection to a container is only exemplary. Any other form of connecting means may be utilized. For example, the housing 16 may be fixedly joined to the container 14 by means of a bayonet-type connection, a snap or press-fit connection, or any other type of conventional connection which detachably connects the housing 16 to the container 14.

Figure 5:
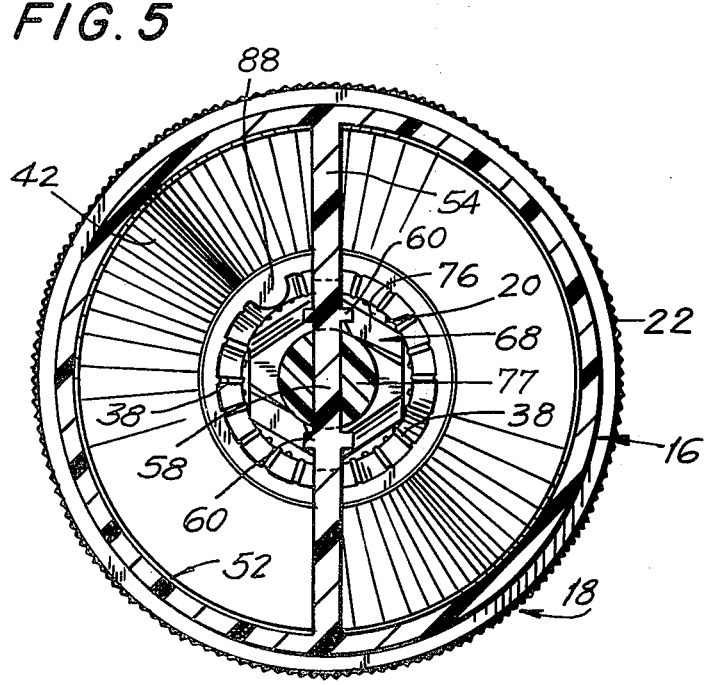
FIG. 5 is similar to FIG. 3, and is taken along line 5—5 in FIG. 4 and illustrates some further details of the grinding chamber and a projection which is formed therein to more efficiently grind the material which is directed thereinto.

The housing 16 is also provided with a generally transverse partition wall 54 which is integrally formed or molded with the cylindrical wall 40 at the lateral ends thereof as well as to the tapered wall 42 at the lower end thereof as viewed in FIG. 2. The partition wall 54 extends between diametrically opposite portions of the housing 16 and is provided with a generally trapezoidal-shaped or U-shaped opening 56 as shown. The opening 56 starts at the discharging opening 44 of the hopper wall 42 and extends as shown to form a generally elongate bridge arm portion 58, the bridge arm 58 having a relatively short length compared to the diameter of the housing 16. Such a construction substantially rigidifies and strengthens the bridge arm and prevents excessive deformations and damage thereto when the grinder gear member 20 is anchored to the same and is rotated during grinding, as to be described. Four spaced projection stops or tabs 60, best shown in FIG. 5, are utilized to fix the position of the grinder gear member 20 to ensure that this member remains in axial alignment with the axis of the rotary joint 52. This will be more fully described below.

Figure 6:
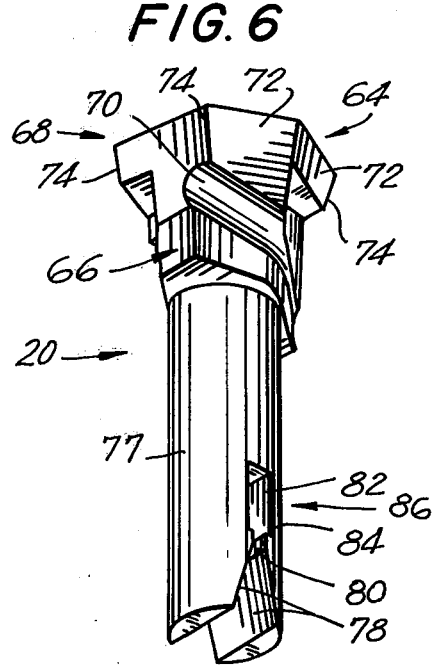
FIG. 6 is a perspective view of the gear member shown in FIGS. 2–5, and further showing the details of the head portion which cooperates with the grinding chamber as well as the shaft portion which is attached to the bridge arm for locking the three elements to each other as shown in FIGS. 2 and 4, and for fixing the three elements in the axial direction of the shaft portion while permitting rotation about the axis of the shaft portion of the gear member and one of the housings relative to the other of the housings.

Referring to the figures, and particularly FIG. 6, the details of the grinder gear member 20 are shown. The gear member 20 has a head portion 64 which has an overall axial dimension, as measured along the axis of the gear member 20, substantially equal or corresponding to the axial length of the grinding chamber 36. The head portion 64 has two separate and distinct but cooperating sections. A first transverse section 66 is provided which is intended to be disposed proximate to the axially inner conical surface 32, the transverse section 66 extending substantially across the diametrical dimension of the diverging surface 32 to agitate and, together with at least some of the ribs 38, grind the pepper corns 45 in the region of the inner conical or diverging surface 32. In this sense, the transverse section 66 acts as a transverse vane which rotates to urge the pepper corns 45 within the region proximate to the surface 32 to move in circular movements along the surface while being urged by the transverse section 66 against the ribs 38 on the surface. Accordingly, the transverse section 66 serves to agitate the pepper corns and begins the grinding process wherein the pepper corns are substantially reduced in size.

Advantageously, the transverse section 66 is provided with at least one flute 70 on the surface thereof as shown. The flute 70 is generally of uniform cross-sectional dimensions along the length thereof to correspond with the dimensions of the pepper corns or the like to be ground. The flute 70 generally extends spirally along the axial length of the transverse section 66. In this manner, pepper corns which become entrapped within the flute or feed groove 70 are advanced within the same through the grinding chamber towards the region of the central constriction 30. In the presently preferred embodiment, a flute is provided on each of the two opposing sides of the transverse section 66 so that pepper corns may be simultaneously fed or advanced through the grinding chamber along both opposing surfaces of the transverse section 66.

Figure 4:
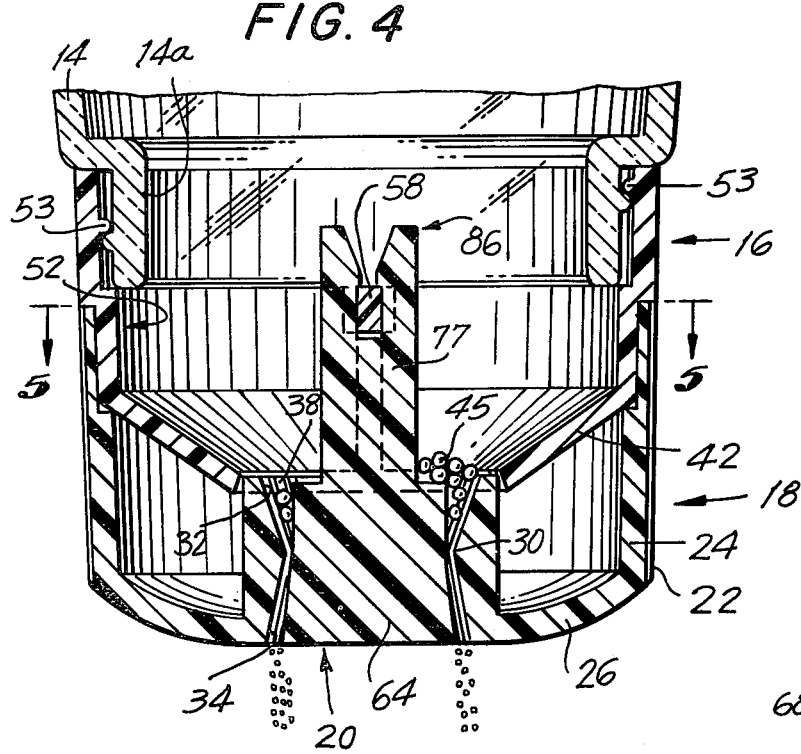
FIG. 4 is similar to FIG. 2 and is a cross-sectional view of the device shown in FIG. 2, taken along line 4—4 and showing some further details of the means by which the shaft of the gear member snap-fittingly engages the bridge arm of one of the cylindrical elements of the grinding device.

The head portion 64 also includes an end section 68 which is in the nature of a hexagonal gear which, when the gear member 20 is in the operative positions shown in FIGS. 2 and 4, is in the region or proximate the axially outer conical surface 34 of the grinding chamber 36. The end section 68 is shown to have a hexagonal cross section. However, as will become apparent, the end section may have a cross-sectional area in the shape of any regular polygon to form a plurality of grinding surfaces 72 and edges 74. The grinding surfaces 72 form the spaces 76 with the grinding chamber through which the pepper grains may pass and exit through the dispensing opening at the outlet end of the grinding portion 28. On the other hand, the grinding edges 74 cooperate with at least some of the ribs 38 within the grinding chamber to grind the pepper corns in the region of the outer conical surface 34. In the presently preferred embodiment, the grinding surfaces 72 which are adjacent to each other have different axial lengths to form axially stepped grinding areas which facilitate advancement of the ground pepper through the grinding chamber while permitting the pepper corns to be ground to a fairly coarse consistency prior to being dispensed through the spaces 76. Clearly, the coarseness of the finely ground pepper corns will be at least partially determined by the axial position of the end section 68 relative to the outer surface 34. In the presently preferred embodiment, the gear member 20 is connected to the bridge arm 58 in such a manner so as to permit slight axial displacement of the gear member by controlling the axial spacing between the housings 16 and 18. The slight amount of play which may be built into the structure, as to be described below, provides some limited control over the coarseness of the grains which are ultimately dispensed. Accordingly, by slightly shifting the gear member 20 in an axial direction relative to the grinding chamber, the grinding surfaces 72 and the edges 74 are brought closer together or moved further away from the ribs 38 on the outer conical surface 34, this change in spacing determining the coarseness to which the pepper corns are ground.

Referring to FIG. 6, the shaft portion 77 is shown to be provided at the free end 86, thereof opposite to where the head portion is provided with a pair of spaced, tapered surfaces 78 which diverge axially outwardly and a slot 80 at the inner ends of the surfaces 78. A wider slot 82 is provided beyond the slot 80 to form ridges or shoulders 84 which act as stop means as to be described. The axial height or length of the slot or rectangular channel 82 is determined to substantially correspond with the axial height of the bridge arm 58. On the other hand, the width of the slot 80 is selected to be less than the width of the bridge arm. As best shown in FIG. 4, such a bifurcated construction permits the free end of the shaft portion 77 to be placed in snap-fitting engagement with the bridge arm 58 by forcing the same through the slot 80 and thereby slightly deforming or expanding the legs of the bifurcated construction. Upon the bridge arm 58 being received within the rectangular channel 82, the legs of the bifurcated free end 86 revert to their normal undeflected positions and effect the snap-fitting engagement. In the engaged position, clearly, the ridges or shoulders 84 act as stop means which prevent the bridge arm from leaving the channel 82 without first again deforming or spreading the legs of the bifurcated free end.

As described above, the axial length of the channel 82 is advantageously greater than the corresponding axial length or height of the bridge arm 58. This is best illustrated in FIGS. 2 and 4. In this manner, some axial free play is permitted between the gear member 20 and the bridge arm 58. Thus, while the gear member 20 is basically locked in place and prevented from moving axially, it can be slightly moved by relative axial separation or joining of the housings 16 and 18. This, as above mentioned, permits some control on the coarseness of the ground grains. As opposed to some prior art devices, the present construction is extremely efficient in operation and permits pepper to be ground "coarse" rather than "fine" and this is most frequently a desired result.

The specific materials from which the grinding mechanism 12 is made are not critical for the purposes of the present invention. However, the simplicity of the construction and the extremely small number of parts involved, make the present construction most suitable for being made from plastic materials. In the presently preferred embodiment, the gear member 20 is made from "Delrin", a DuPont product. "Delrin" is a very strong plastic material and is suitable for this application. The housings 16 and 18 may similarly be made from numerous materials. In the presently preferred embodiment, for example, they are made from "Cycolac", a product of Borg Warner. "Cycolac" is a material which is used for football helmets and is extremely strong and durable. Clearly, while the materials utilized are not critical, they should have sufficient strength to be able to withstand the relatively large stresses which are formed within such a grinding device. When made of plastic materials, these are advantageously molded and this result in a very simple and economical method of manufacture and assembly.

As should be evident from the above description, the grinding mechanism of the present invention is extremely simple in construction. In essence, it merely requires three plastic-molded parts. By making the end section 68 of dimensions greater than the diametrical dimensions of the central constriction 30, the gear member 20 is not permitted to pass through the grinding chamber 36 although it is received therein. Such a construction permits very easy and rapid assembly by merely aligning the housings 16 and 18 as shown to form the rotary joint 52 and subsequently inserting the shaft portion 77, bifurcated free end first, through the grinding chamber to effect a snap-fitting engagement between the bifurcated free end and the bridge arm 58. Subsequent to the snap-fitting engagement, the projections or stops 60 prevent the bifurcated free end from riding along the bridge arm and fix the position thereof so as to maintain the gear member 20 in a substantially coaxially aligned position as shown.

When the housings 16, 18, and the gear member 20 are assembled as described above, the grinding mechanism 12 constitutes a self-contained unit which may then be attached to a storage container 14 as suggested above.

Aesthetically, it is noted that the grinding mechanism 12 does not outwardly give the appearance of a grinding mechanism. Initially, unlike many prior art grinding devices and mills, the dispensing opening is normally at the top of the device when not in use. Only when the pepper mill 10 is in use, is the pepper mill 10 inverted as shown in FIGS. 2 and 4. Aside from the aesthetically pleasing appearance of the pepper mill, such an arrangement clearly prevents ground pepper grains which have remained within the grinding chamber 36 to be deposited upon a table or other similar surface after the pepper mill is put down and no longer in use. By reverting the pepper mill 10 to the normal upright position, such undesirable escape of pepper grains is prevented.

A further important feature of the grinding mechanism 12, referring to FIG. 5, is the provision of at least one projection 88 which extends radially inwardly from the inner conical surface 32 in the direction of the transverse section 66 to leave a small clearance as shown in FIGS. 4 and 5, between the projection 88 and the transverse section when the latter is aligned with the former. In this manner, the projection 88 ensures that the pepper corns are acted upon by the transverse section during rotation of the same and reduced in size. With conventional grinding arrangements which do not have such a projection, it has been found that it typically requires approximately three turns in order to obtain a full grinding of the pepper corns. However, with the provision of at least one such projection 88, only one turn is required because the pepper corns become wedged between the projection 88 and the transverse section and this assures their reduction in size.

The operation of the pepper mill 10 will now be described to the extent to which it has not been described above. After the grinding mechanism 12 is assembled, the container 14 which stores the material to be ground is attached to the housing 16 as above described. When the container 14 is a reusable one and is empty, the grinding mechanism 12 may be removed to refill the container. Inverting the pepper mill 10 from the position shown in FIG. 1 to the position shown in FIGS. 2 and 4 causes the pepper corns within the container 14 to drop through the container neck 14a and into the housing 16, wherein the pepper corns are guided by the hopper or tapered wall 42 into the grinding chamber 36. If the housing 18 is held stationary, rotation of either the container 14 or the housing 16 causes corresponding rotation of the partition wall 54 and the bridge arm 58. Such rotary motion is thereby imparted to the gear member 20 which in turn causes the head portion 64 to rotate within the stationary grinding chamber 36. Pepper corns which have fallen into the grinding chamber 36 are thereby reduced in size and ground into pepper grains which are dispensed through the spaces 76 between the grinding surfaces 72 and the outer conical surface 34. Alternately, of course, the housing 16 and therefore the bridge arm 58 may be maintained stationary while the housing 18 is rotated relatively thereto. In this case, the head portion 64 remains stationary while the grinding chamber 36 rotates relative thereto. In each case, relative rotation is achieved between the head portion 64 and the grinding chamber 36 and the pepper corns 45 are ground in the same manner.

By maintaining the axial lengths of the housings 16 and 18 relatively small, the grinding mechanism 12 may itself be made small without sacrificing the efficiency thereof. While the bridge arm 58 may be variously placed along the axis of the housing 16, the added advantage of placing it as shown close to the discharging opening 44, is that the shaft portion 77 may be made relatively small. This provides an additional saving in material and cost in manufacture. In this connection, the shaft portion 77 extends from the housing 18 into the housing 16. However, it essentially does not extend into the container 14 as with many prior art grinding devices wherein the shaft extends substantially the entire height of the grinding device or mill.

While what hereinbefore has been described as the presently preferred embodiments of this invention, it is readily apparent that alterations and modifications can be resorted to without departing from the scope of this invention, and such alterations and modifications are intended to be included within the scope of the appended claims.

What is claimed is:

1. A self-contained grinding device for pepper corns and the like attachable to a container for pepper corns, the grinding device comprising a first hollow housing having one axial end thereof provided with an end wall, said end wall being formed with a grinding chamber defining outer grinding means and a dispensing opening; a second hollow housing having one axial end thereof provided with a tapered wall in the nature of a hopper proximate to said first housing and converging in the direction thereof, the other end of said first housing and said one end of said second housing together forming a rotary joint to permit relative rotation between said housings when they are joined in axial alignment, said tapered wall having a discharging opening at the narrowed end thereof which registers with said grinding chamber to permit the pepper corns to be fed by said tapered wall into said grinding chamber when said discharging opening is positioned above said grinding chamber, the other end of said second housing being provided with connecting means for connecting the same to a container containing the pepper corns, said second housing further having a generally transverse bridge arm; and a gear member defining an inner grinding means, said gear member having a head portion receivable within said grinding chamber for limited axial movements therein and cooperating therewith to grind the pepper corns within said grinding chamber upon relative rotation of said inner and outer grinding means, said gear member further having a shaft portion projecting from said head portion and extending through said first housing and into said second housing, said shaft portion having a bifurcated free end and a length to permit snap-fitting engagement with said bridge arm to substantially lock the relative axial positions of said first and second housings and said gear member to each other and only permit rotational movements of said second housing and said gear member relative to said first housing, whereby rotation of said first and second housings relative to each other causes corresponding rotation of said inner and outer grinding means relative to each other and causes grinding of pepper corns which are guided by said tapered wall from the container to said grinding chamber.

2. A grinding device as defined in claim 1, wherein said first and second housings are cylindrical in shape.

3. A grinding device as defined in claim 1, wherein said grinding chamber is defined by a substantially cylindrical surface aligned with the axis of rotation of said rotary joint.

4. A grinding device as defined in claim 3, wherein said cylindrical surface has a central constriction intermediate the two ends thereof, and having inner and outer conical surfaces diverging on each side of said central constriction, each of said conical surfaces being provided with generally axial ribs projecting into said grinding chamber.

5. A grinding device as defined in claim 4, wherein said gear member head portion has an axial length generally corresponding to the axial length of said grinding chamber, said head portion proximate to the axially inner conical surface forming a generally transverse section extending substantially across the diametrical dimension of said inner conical surface to agitate and, together with at least some of said ribs, grind those pepper corns in the region of said inner conical surface.

6. A grinding device as defined in claim 5, further comprising a projection extending from said inner conical surface towards said transverse section to leave a small clearance between said projection and said transverse section when the latter is aligned with the former, whereby said projection insures that the pepper corns are acted upon by said transverse section during rotation of the same and reduced in size.

7. A grinding device as defined in claim 5, wherein said transverse section is provided with at least one flute within a surface thereof, said flute being of generally uniform dimensions along the length thereof to correspond with the dimensions of the pepper corns or the like to be ground, said flute generally spirally extending along the axial length of said transverse section to advance the pepper corns entrapped within said flute through said grinding chamber.

8. A grinding device as defined in claim 7, wherein a flute is provided on each of two opposing sides of said transverse member.

9. A grinding device as defined in claim 4, wherein said gear member head portion has an axial length generally corresponding to the axial length of said grinding chamber, said head portion proximate to the axially outer conical surface forming an end section having cross-sectional areas in the shape of a regular polygon and forming a plurality of edges which cooperate with at least some of said ribs to grind the pepper corns in the region of outer conical surface.

10. A grinding device as defined in claim 9, wherein said end section has cross-sectional areas in the shape of hexagons.

11. A grinding device as defined in claim 1, wherein said transverse bridge arm is integrally formed with both said second hollow housing and said tapered wall to rigidify and strengthen said bridge arm and prevent excessive deformation and damage thereto when said gear member is anchored to the same and is rotated during grinding.

12. A grinding device as defined in claim 1, wherein said connecting means comprises a plurality of circumferentially spaced projections suitable for being received and threadedly engaged by a screw thread provided on a container.

13. A grinding device as defined in claim 1, wherein said first housing is provided with surface irregularities over at least a portion of the external surface thereof to provide a roughened surface to facilitate gripping of said first housing to effect relative rotation between said housings.

14. A grinding device as defined in claim 13, wherein said surface irregularities are in the nature of a circumferential array of grooves.

15. A grinding device as defined in claim 1, wherein said housings and said gear member are molded from plastic materials.

16. A grinding device as defined in claim 15, wherein said housings are molded from "Cycolac".

17. A grinding device as defined in claim 15, wherein said gear member is molded from "Delrin".

* * * * *